May 26, 1953 J. J. KORZDORFER 2,640,181
DYNAMOELECTRIC MACHINE
Filed Nov. 25, 1949
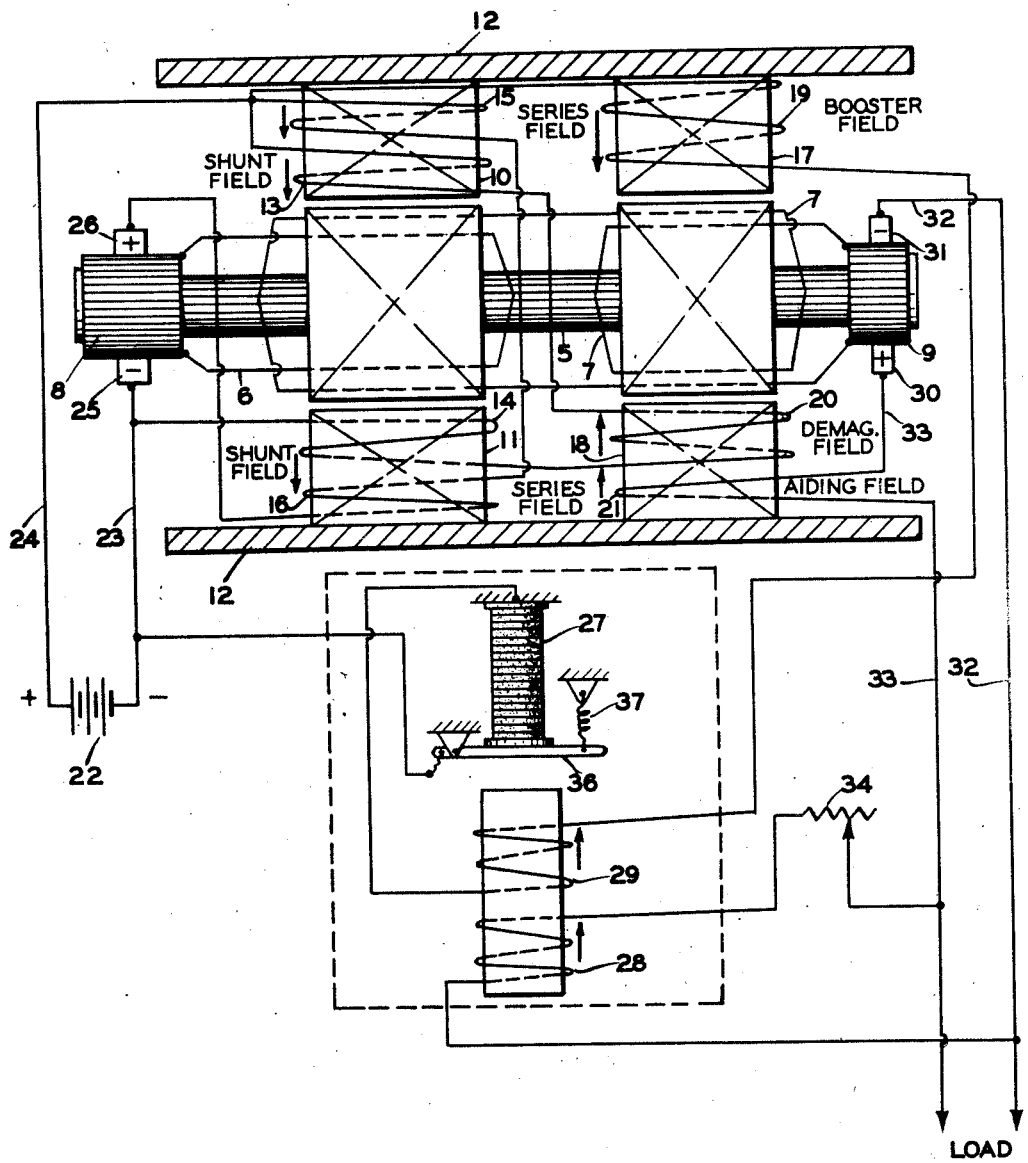
INVENTOR.
JOHN J. KORZDORFER
BY
*Herbert Lowdins Jr.*
ATTORNEY Patented May 26, 1953

2,640,181

UNITED STATES PATENT OFFICE 2,640,181

DYNAMOELECTRIC MACHINE

John J. Korzdorfer, Rumson, N. J., assignor to Bendix Aviation Corporation, Teterboro, N. J., a corporation of Delaware Application November 25, 1949, Serial No. 129,404

6 Claims. (Cl. 322—25)

The present invention relates to regulating means for direct current commutator type dynamoelectric machines of the type disclosed and claimed in U. S. Patent No. 2,480,844 granted September 6, 1949, to Kenneth H. Fox and assigned to Bendix Aviation Corporation and more particularly to an arrangement for controlling the output thereof under pulsing loads.

Under normal load conditions, a carbon pile regulator is satisfactory for holding the voltage substantially constant. However, when loads of a pulsing type are applied to the dynamotor, oscillations of an electromechanical nature are set up in the carbon pile regulator and booster field causing the dynamotor to go unstable. Also under a pulsing load, wherein the dynamotor goes from full load to no load to full load, there is a tendency for the carbon pile to be damaged from the shock imposed thereupon.

An object of the present invention is to prevent such instability in the dynamotor by first introducing in output line of the aforenoted type dynamotor a winding in the booster demagnetizing field winding circuit which aids the demagnetizing field winding and second, by providing a coil which aids the main regulating coil in the solenoid of the carbon pile regulator and which aiding coil is responsive to changes in the energization of the booster field so that the electromechanical oscillations tending to cause the dynamotor to go unstable may be eliminated.

It is an object of the invention to provide an improved dynamoelectric machine with means for stabilizing the output under a pulsing load.

Another object of the invention is to provide a dynamotor having novel means for preventing electromechanical oscillations.

Another object of the invention is to provide a dynamotor with improved regulation for pulsing loads.

A further object of the invention is to provide a dynamotor having a novel anti-hunt circuit.

These and other objects and features of the invention will appear more fully hereinafter from a consideration of the following description taken in connection with the accompanying drawing wherein one embodiment of the invention is illustrated by way of example.

In the drawing:

The single figure is a schematic diagram of a dynamotor and regulator embodying one form of the invention.

Referring to the drawing, there is illustrated diagrammatically a dynamotor having a rotor shaft 5 which has a motor winding 6 and a generator winding 7. The motor winding 6 is connected to input commutator 8 in a conventional manner as is well known in the art. The generator winding is connected to output commutator 9 in a similar manner.

Oppositely disposed main pole pieces 10 and 11 securely mounted on dynamotor frame 12 carry thereon shunt field windings 13 and 14. Also carried by the pole pieces 10 and 11 are series field windings 15 and 16. Only one pair of main field poles is shown but it is understood, of course, that the dynamotor may be of the multipole type having more than one pair of main field poles.

An additional pair of pole pieces 17 and 18 are securely mounted on dynamotor frame 12 and carry thereon booster field or regulator winding 19 and demagnetizing winding 20. The foregoing structure is disclosed and claimed in the U. S. Patent No. 2,480,844, granted September 6, 1949, to Kenneth H. Fox and assigned to Bendix Aviation Corporation.

A novel feature of the present invention is the provision of an additional winding 21 on the pole 18 which is arranged to produce a magnetic effect in aiding relation to the demagnetizing field winding 20.

The motor winding 6 is energized from a suitable source of operating current such as a battery 22, through input conductor 23 and input conductor 24. The input conductor 23 is connected to commutator brush 25, while input conductor 24 is connected through series field windings 15 and 16 to brush 26. The brushes 25 and 26 cooperate respectively with the segments of the commutator 8 to provide an electrical connection therewith. The shunt field windings 13 and 14 are connected in series with the demagnetizing winding 20 and across the input conductors 23 and 24. The shunt and series field winding are arranged in magnetically aiding relation.

The booster field winding 19 is connected in series with a variable resistance element 27 and a novel compensating coil 29 across the input conductors 23 and 24. The resistance element 27 may be of the carbon pile type having a main control winding 28 and a coil 29 arranged in magnetically aiding relation with the main control winding 28. The winding 28 is energized from the output of the generator winding 7 through brushes 30 and 31 cooperating with the segments of the commutator 9 and connected to output conductors 32 and 33. The demagnetizing field aiding winding 21 is connected in series with the output conductor 33. A variable resistor 34 is connected in series with the solenoid winding 28 to calibrate the regulator 27. The solenoid aiding winding 29 is connected in series with the booster winding 17.

The windings 28 and 29 are arranged so as to affect an armature 36 biased under tension of a spring 37 in opposition to the biasing force of the windings 28 and 29. The spring 37 is arranged so as to balance the pull on the armature 36 when the cumulative effect of the windings 28 and 29 has a predetermined regulated value. The regulator may be of a type such as shown in U. S. Patent No. 2,427,805, granted September 23, 1947, to William G. Neild, and assigned to Bendix Aviation Corporation.

In operation without the windings 21 and 29, upon the sudden application of load the output voltage drops. This causes a decrease in the pull of winding 28, thus permitting a decrease in the resistance of the element 27. Upon the load being suddenly removed the output voltage rises causing an increase in the pull of winding 28, thus causing an increase in the resistance of the element 27. It can readily be seen that with a pulsating load, the regulator would not have time to stabilize the output and would be fluctuating over a wide range. By adding the aiding coil 21 in series with the output as the load increases the current in the coil 21 increases thus aiding the magnetic flux of winding 29 in opposing the increase in magnetic flux by the booster winding 17 so as to tend to retard change in the flux affecting the generator winding 7 and the output across lines 32 and 33.

The magnetic pull of the solenoid aiding winding 29 varies with the current flowing in the booster winding 17, so that upon the resistance of the carbon changing in response to change in load the coil 29 tends to retard further change in the resistance of the carbon pile 27.

In other words, the windings 17 and 28 are primarily responsive to voltage while the windings 21 and 29 are responsive to current and all coact to provide a cumulative effect for holding the output of the dynamotor substantially constant even under rapidly pulsating loads.

Although only one embodiment of the invention has been illustrated and described, various changes in the form and relative arrangement of the parts, which will now appear to those skilled in the art, may be made without departing from the scope of the invention.

What is claimed is:

1. A dynamoelectric machine of the type having a motor portion and a generator portion, said generator portion including a booster winding, input and output circuits: the improvement comprising means including a winding in series with said output circuit to oppose the magnetic flux of said booster winding upon an increase in current in said output circuit, means for regulating said booster winding, said means including a first control winding responsive to the voltage of said output circuit, a second control winding responsive to current flow in said booster winding, said windings coacting to provide a cumulative control to effect said booster winding to maintain a predetermined output voltage under pulsing load conditions.

2. A dynamotor of the type having a motor portion and a generator portion, input and output circuits, said generator portion including a booster winding; the improvement comprising means including a winding in series with said output circuit to oppose the magnetic strength of said booster winding upon an increase in the output current and means for regulating said booster winding in response to output voltage so that a predetermined output voltage may be maintained under pulsing load conditions.

3. A dynamoelectric machine comprising, in combination, an armature having motor and generator windings, a stationary member having field windings and a booster winding, an input and output circuits, a booster opposing winding responsive to current flow in said output, means for regulating the energization of said booster winding in response to output voltage and means including a control winding in series with said booster winding responsive to current flow in said booster winding to retard said regulating means so that a predetermined output voltage may be maintained by said regulating means under pulsing load conditions.

4. A dynamoelectric machine of a type including a motor winding and a generator winding, said generator winding including a booster winding; the improvement comprising a booster opposing winding adapted to effect said booster winding in response to the output current of said machine, control means for regulating said booster winding in response to the output voltage, and means including a control winding in series with said booster winding to retard said control means in response to current flow in said booster winding.

5. A dynamoelectric machine comprising, in combination, an armature having motor and generator windings, a stationary member having field windings, said field windings including a booster winding and a demagnetizing winding, input and output circuits; the improvement comprising a booster opposing winding in series circuit relation with said output circuit and responsive to the current flow therein to effect said booster winding, means for regulating said booster winding including a first electromagnetic winding responsive to output voltage, a second electromagnetic winding responsive to current flow in said booster windings, said electromagnetic windings having a cumulative effect to maintain a predetermined output voltage under pulsing load conditions.

6. A dynamotor comprising an armature having motor and generator windings, a stationary member having field windings, said field windings including shunt windings, series windings, booster winding, demagnetizing winding and a booster opposing winding, input and output circuits, circuit means for connecting said shunt windings, series windings, booster windings and demagnetizing winding to said input circuit, circuit means for connecting said booster opposing winding in series with said output circuit in aiding relationship to said demagnetizing winding, and means for regulating said booster winding including a first electromagnetic winding responsive to output voltage, a second electromagnetic winding responsive to current flow in said booster windings, said electromagnetic winding and said booster opposing winding having a cumulative effect to maintain a predetermined output voltage under pulsing load conditions.

JOHN J. KORZDORFER.

References Cited in the file of this patent

UNITED STATES PATENTS

| Number | Name | Date |
|---|---|---|
| 1,160,749 | Neeley | Nov. 16, 1915 |
| 1,252,511 | Turbayne | Jan. 18, 1918 |
| 1,378,192 | Pennington | May 17, 1921 |
| 1,436,152 | Churchward | Nov. 21, 1922 |
| 1,468,159 | Holifield | Sept. 18, 1923 |
| 2,427,919 | Mironowicz | Sept. 23, 1947 |
| 2,458,507 | Fox | Jan. 11, 1949 |
| 2,464,439 | Davis | Mar. 15, 1949 |
| 2,480,844 | Fox | Sept. 6, 1949 |